United States Patent
Ohi et al.

(10) Patent No.: US 8,046,368 B2
(45) Date of Patent: Oct. 25, 2011

(54) DOCUMENT RETRIEVAL SYSTEM AND DOCUMENT RETRIEVAL METHOD

(75) Inventors: Hiroko Ohi, Machida (JP); Yoshiki Niwa, Hatoyama (JP); Kiyohiro Obara, Hachioji (JP)

(73) Assignee: Hitachi, Ltd., Tokyo (JP)

(*) Notice: Subject to any disclaimer, the term of this patent is extended or adjusted under 35 U.S.C. 154(b) by 423 days.

(21) Appl. No.: 12/029,694

(22) Filed: Feb. 12, 2008

(65) Prior Publication Data

US 2008/0270386 A1    Oct. 30, 2008

(30) Foreign Application Priority Data

Apr. 27, 2007 (JP) ................. 2007-119872

(51) Int. Cl.
*G06F 7/00* (2006.01)
*G06F 17/30* (2006.01)
(52) U.S. Cl. ........................................ 707/741
(58) Field of Classification Search .............. None
See application file for complete search history.

(56) References Cited

U.S. PATENT DOCUMENTS

| | | | |
|---|---|---|---|
| 6,584,406 B1 | 6/2003 | Iwayama et al. | |
| 2005/0198027 A1 | 9/2005 | Hamaguchi | |
| 2005/0261941 A1* | 11/2005 | Scarlat | 705/3 |
| 2006/0235881 A1* | 10/2006 | Masarie et al. | 707/104.1 |

FOREIGN PATENT DOCUMENTS

| | | |
|---|---|---|
| JP | 9-62693 | 3/1997 |
| JP | 2000-155758 | 6/2000 |
| JP | 2004-178490 | 6/2004 |

OTHER PUBLICATIONS

Daichi Mochihashi, et al., Learning an Optimal Distance Metric in the Linguistic Vector Space, D-11 vol. Jxx-D-11, No. xx pp. 1-10.
Koichi Saito, et al., Numeral Information Extraction from Newspaper's Articles, May 29, 1998, Faculty of Engineering, Yokohama National University.

* cited by examiner

*Primary Examiner* — Michael Hicks
(74) *Attorney, Agent, or Firm* — Antonelli, Terry, Stout & Kraus, LLP.

(57) ABSTRACT

A document retrieval is performed with similarities between documents in numeric data taken into consideration. To this end, generated is a set E of intervals in which each element of a set D of numeric values representing a feature A is included in any one of the intervals. Each numeric value in each document is indexed by assigning, with 1, an interval including an element x of the set D, and with 0, an interval without the element x. Each document data including numeric values is indexed by indexing its text part with term frequencies, and by indexing its numeric-value part with the above-described numeric value indexing scheme. By use of indices thus created for each of the document data, similarities between the document data are calculated using a vector space model or a probability model, and the document data are presented in order of similarity.

13 Claims, 21 Drawing Sheets

FIG. 3

302 — Associative search  112

|  | Patient ID | Reporting date | Report |
|---|---|---|---|
| ☑ | 350046 | 2006/11/28 | Male at age of 59.<br>Having dry throat and high urinary frequency.<br>Blood sugar level 128 mg/dl. |
| ☐ | 1112708 | 2006/12/1 | Body feels listless and easy to be tired.<br>Blood sugar level is 150 mg/dl. |
| ☐ | 1112711 | 2006/12/9 | Male at age of 80.<br>Blood sugar level is 110 mg/dl.<br>Drink water frequently. |
| ☐ | 1192048 | 2007/1/20 | Thirsty throat. High blood sugar level. |

301

112

Associative search

|  | Patient ID | Reporting date | Report |
|---|---|---|---|
| ☑ | 350046 | 2006/11/28 | Male at age of 59.<br>Having dry throat and high urinary frequency.<br>Blood sugar level 128 mg/dl. |
| ☐ | 1112711 | 2006/12/9 | Male at age of 80.<br>Blood sugar level is 110 mg/dl.<br>Drink water frequently. |
| ☐ | 1192048 | 2007/1/20 | Thirsty throat. High blood sugar level. |
| ☐ | 1112708 | 2006/12/1 | Body feels listless and easy to be tired.<br>Blood sugar level is 150 mg/dl. |

FIG. 4A

| Feature name | Post-converted character string (Index character string) |
|---|---|
| Blood sugar level | Not less than 10 mg/dl but less than 50 mg/dl |
| Blood sugar level | Not less than 50 mg/dl but less than 80 mg/dl |
| Blood sugar level | Not less than 80 mg/dl but less than 100 mg/dl |
| Blood sugar level | Not less than 100 mg/dl but less than 130 mg/dl |
| Blood sugar level | Not less than 130 mg/dl but less than 200 mg/dl |

FIG. 4B

| Feature name | Post-converted character string (Index character string) |
|---|---|
| Blood sugar level | Not less than 10 mg/dl but less than 70 mg/dl |
| Blood sugar level | Not less than 70 mg/dl but less than 120 mg/dl |
| Blood sugar level | Not less than 120 mg/dl but less than 200 mg/dl |

FIG. 4C

| Feature name | Post-converted character string (Index character string) |
|---|---|
| Age | Younger than 20 |
| Age | Not younger than 20 but younger than 40 |
| Age | Not younger than 40 but younger than 60 |
| Age | Not younger than 60 |

FIG. 6

| Patient ID | Term frequency Term |
|---|---|
| 0350046 | 1 Throat<br>1 Dry<br>1 Urinary<br>1 Frequency<br>1 High<br>1 Blood sugar level<br>1 Blood sugar level %: not less than 100 mg/dl but less than 130 mg/dl<br>1 Blood sugar level %: not Less than 120 mg/dl but less than 200 mg/dl<br>1 Age<br>1 Age %: not younger than 40 but younger than 60<br>1 Male |
| 1112708 | 1 Body<br>1 Listless<br>1 Be tired<br>1 Easy to<br>1 Blood sugar level<br>1 Blood sugar level %: not less than 130 ml/dl but less than 200 mg/dl<br>1 Blood sugar level %: not less than 120 ml/dl but less than 200 mg/dl |
| 1112711 | 1 Blood sugar level<br>1 Blood sugar level %: not less than 100 ml/dl but less than 130 mg/dl<br>1 Blood sugar level %: not less than 70 ml/dl but less than 120 mg/dl<br>1 Water<br>1 Frequently<br>1 Drink<br>1 Age<br>1 Age %: not younger than 60<br>1 Male |
| 1192048 | 1 Throat<br>1 Thirsty |

Set E of intervals

FIG. 9

| Feature name | Value (Term) | Post-converted character string |
|---|---|---|
| Size | miliary size | 2mm |
| Size | rice-grain size | 4mm |
| Size | read bean size | 7mm |
| Size | soybean size | 1cm |
| Size | little finger top size | 1.5cm |
| Size | sparrow egg size | 1.5cm |
| Size | broad bean size | 2cm |
| Size | thumb top size | 2.5cm |
| Size | pigeon egg size | 3cm |
| Size | walnut size | 4cm |
| Size | hen egg size | 5cm |
| Size | fist size | 7cm |
| Size | infant head size | 10cm |
| Size | goose egg size | 12cm |

FIG. 10

| Feature name | Value (Term) | Post-converted character string |
|---|---|---|
| Size | miliary size | 1-2mm |
| Size | rice-grain size | 3-4mm |
| Size | read bean size | 5-7mm |
| Size | soybean size | 1-1.2cm |
| Size | little finger top size | 1.5-1.7cm |
| Size | sparrow egg size | 1.5-1.8cm |
| Size | broad bean size | 2-2.3cm |
| Size | thumb top size | 2.5-2.8cm |
| Size | pigeon egg size | 3-4cm |
| Size | walnut size | 4-4.5cm |
| Size | hen egg size | 5-6cm |
| Size | fist size | 7-8cm |
| Size | infant head size | 10-13cm |
| Size | goose egg size | 12-13cm |

| Feature name | Condition |
|---|---|
| Length | Numeral + cm |
| Length | Numeral + m |
| Length | Numeral + Meter(s) |

| Feature name | Pre-converted character String | Post-converted character string |
|---|---|---|
| Length | cm | *10**2mm |
| Length | m | *10**3mm |
| Length | Meter(s) | *10**3mm |

FIG. 20A

| Feature name | Term |
|---|---|
| Blood sugar level | Blood sugar level |
| Blood sugar level | Blood sugar |
| Age | Age |
| Age | Old |
| Blood pressure | Blood pressure |
| Weight | Weight |

FIG. 20B

| Feature name | Unit |
|---|---|
| Blood sugar level | mg/dl |
| Age | Years old |
| Age | At age of |
| Blood pressure | mmhg |
| Weight | Kilograms |
| Weight | kg |

FIG. 21

| Feature name | Pattern |
|---|---|
| Blood sugar level | Blood sugar level + Numeral + mg/dl |
| Blood sugar level | Blood sugar + Numeral + mg/dl |
| Blood sugar level | Numeral + mg/dl + Blood sugar |
| Age | Age + Numeral + Years old |
| Age | Age + At age of + Numeral |
| Blood pressure | Blood pressure + Numeral + mmhg |
| Weight | Weight + Numeral + kg |

FIG. 23A

| Data | Document data item | Blood sugar level data item | ... | Age data item |
|---|---|---|---|---|
| Progress note | Report | Test result (Blood sugar level) | ... | Basic information (Age) |
| Nursing note | Text | Blood sugar level | ... | Age |
| : | : | : | : | : |
| Summary on discharge | Report | Test result (Blood sugar level) | ... | Patient information (Age) |

FIG. 23B

Example of data on progress notes

| Patient ID | Reporting date | Report | Basic information (Age) |
|---|---|---|---|
| 0350046 | 2006/11/28 | Blood sugar level 128 mg/dl. | 80 years old |
| 1112708 | 2006/12/01 | Body feels listless and easy to be tired. Blood sugar level is 150 mg/dl. | 59 years old |
| 1112711 | 2006/12/09 | Blood sugar level is 110 mg/dl. Drink water frequently. | 45 years old |
| 1192048 | 2007/1/20 | Thirty throat. High blood sugar level. | 27 years old |

DOCUMENT RETRIEVAL SYSTEM AND DOCUMENT RETRIEVAL METHOD

CLAIM OF PRIORITY

The present application claims priority from Japanese application JP 2007-119872 filed on Apr. 27, 2007, the content of which is hereby incorporated by reference into this application

BACKGROUND OF THE INVENTION

1. Field of the Invention

The present invention relates to a document retrieval system and a document retrieval method, and particularly to a system for retrieving a document including numeric data and a method of retrieving the same.

2. Description of the Related Art

Advances in digitization of document information have made it critical to retrieve pieces of information needed by users from a vast amount of information. Information retrieval techniques are those for solving such an issue, and Internet search engines are applications of the information retrieval techniques. Once a user inputs his/her search request, pieces of information relevant to the input are retrieved from the vast amount of document information, and the relevant pieces of information are displayed in order of relevance.

Japanese Patent Application Laid-open Publication No. 2000-155758 titled "Method of Searching Documents and A Service For Searching Documents" discloses so-called "associative search," a method for retrieving, upon receiving a group of documents inputted by a user as his/her search request, a group of documents relevant to the inputted group of documents in a document database. In the associative search, firstly each document is broken into terms (or character strings). Then, a vector representing term frequencies each indicating how many times a specific term appears in each document is generated. Finally, documents relevant to the inputted group of documents are retrieved on the basis of similarities between vectors for the inputted documents and vectors for the documents in the document database (see Mochihashi, Daichi, et al. "Learning an Optimal Distance Metric in the Linguistic Vector Space," The transactions of the Institute of Electronics, Information and Communication Engineer on Information and Systems D-II, Vol. J88-D-II, No. 4, pp. 747-756, April, 2005), and on the basis of similarities between documents calculated by using a probability model (see Japanese Patent Application Laid-open Publication No. Hei. 9-62693, titled "Document Classification Method Using Probability Model").

SUMMARY OF THE INVENTION

In the associative search, if a numeric datum (for example, an actual measurement value datum) is included in a document, the numeric datum is treated as a term, and the frequencies of terms including the numeric datum in the document are calculated. Then, on the basis of the calculated frequencies, similarities between documents are calculated. However, in some cases, a user may want to treat, as a single term, a specific numeric value and its approximate numeric values. For example, such a need exists in a case where a doctor or pharmacist wants to search for information on patients having symptoms and conditions similar to those of a certain patient, in his/her working place in which a medical information system, such as an electronic medical record system and an ordering system, is introduced.

In such a case, a doctor or pharmacist refers to progress notes or the like in the electronic medical record of a patient, and searches for other patients each having symptoms similar to those of the patient. In the progress notes, prognostic information after an initial record is registered, such as the patient's complaints, observational findings and test results as well as the doctor's estimation, determination results and treatment policies Each document of progress notes includes a record of numeric data, such as test values, essential for describing the patient's symptoms. Here, suppose the case where an associative search is performed to retrieve information on patients each having symptoms similar to those of a specific patient. Specifically, each document of progress notes and the like is first broken into terms, then a vector representing term frequencies is generated, and finally documents each having a term-frequency vector which is similar to that in the document of the specific patient are retrieved. In this case, blood sugar levels of 124 mg/dl, 125 mg/dl and 180 mg/dl will be regarded as having the same similarity, for example. However, it is true that the former two numeric values mean moderate blood sugar levels and represent similar symptoms to each other, but the last numeric value means a high blood sugar level and represents a symptom different from those represented by the former two numeric values. As a result, retrieval precision is decreased. This problem occurs because no consideration is given to numeric similarities between essential numeric data.

Some symptomatic findings registered in a medical record are described by mixed use of numeric values and standard terms/codes for describing a symptom (for example, by mixed use of "rice-grain size" and a numeric value "approximately 3 mm to 4 mm" for a size). If an associative search is performed based on documents in which a symptom is described by one of a standard term/code and a numeric value, documents in which the symptom is described by the other one are not retrieved. As a result, the retrieval precision is decreased as the above.

To address these problems, according to the present invention, a document retrieval is performed as follows. A set E of intervals is generated in which each element of a set D of numeric values representing a feature A is included in any one of the intervals. Each numeric value in each document is indexed by assigning, with 1, an interval including an element x of the set D, and with 0, an interval without the element x. In a case where numeric values representing various features are included in a document, a set of intervals is generated for each of the numeric values, and each numeric value is indexed with corresponding intervals. Each document data including numeric values is indexed by indexing its text part with term frequencies, and by indexing its numeric-value part with the above-described numeric value indexing scheme. By use of indices thus created for each of the document data, similarities between the document data are calculated using a vector space model or a probability model, and the document data are presented in order of similarity.

As a method for calculating similarity, a vector space method can be employed, for example. To begin with, a document is expressed with a multidimensional vector:

$$x=(x_1, x_2, \ldots, x_l)$$

Each element of the document vector may be either a binary value indicating whether or not a particular term is included in the document, a frequency indicating how many times a particular term appears in the document, or a real number obtained by weighting the frequency by use of an appropriate method (the term frequency-inverse document frequency weighting scheme or the like).

The similarity between two documents is expressed with a cosine distance between the two document vectors $x_1$ and $x_2$:

$$sim(x_1, x_2) = \cos\theta = \frac{x_1 \cdot x_2}{|x_1||x_2|}$$

In a case where an specific feature is described by mixed use of a term representing a condition of the specific feature (for example, a term "rice-grain size" indicating a size) and a numeric value representing the specific feature (for example, "4 mm") in a document, the following means is used. First of all, a numeric value or an interval is defined as corresponding to the term representing the feature. The numeric value used here should characterize the term, and the interval used here should indicate how large and small numeric values are allowable for the term to represent (for example, a numeric value "3 mm to 4 mm" for a term "rice-grain size"). Thereby, a datum on the correspondence between a numeric value or interval and the term is generated. Subsequently, data including the feature described by mixed use of the term of the condition of the feature and the numeric value representing the feature is indexed by use of an indexing scheme in which: the above-described interval allowable for the term is assigned with 1 when the numeric value representing the feature is included in the interval, while the interval is assigned with 0 when the numeric value representing the feature is not included in the interval; and the interval is assigned with 1 because the term representing the feature is included in the data.

Further, there may be a case where multiple terms are used for a feature in accordance with conditions of the feature corresponding to numeric values (for example, in a case where multiple terms such as "rice-grain size" and "hen egg size" are used for a feature "size"). In this case, firstly generated are data on correspondences each between each of the multiple terms and a representative numeric value or interval representing the term (for example, an interval of "3 mm to 4 mm" for "rice-grain size", and an interval of "50 mm to 60 mm" for "hen egg size").

Thereafter, generated is a set of intervals each having the shortest width (1 mm in this example case) among those of the above-described intervals representing the terms. Here, each numeric value representing the feature should be covered by any one of the set of the intervals.

A numeric datum is extracted from a document, as a group of a numeric value and its related feature information in a specific format. In a database or the like where each item is explicitly assigned with a feature, a numeric datum is extracted as a group of a numeric value and a feature corresponding to the item for the numeric value. Then the extracted numeric value is used as an index for the document data. Alternately, in document data, firstly a meaning of each numeric value in the document data is designated according to terms near the numeric value and a linguistic expression pattern of a unit following the numeric value. Then the numeric value is extracted. To implement such an extraction, conventional methods can be used including a method disclosed in Saito, Koichi, et al. "Numeral Information Extraction from Newspaper's Articles." IPSJ SIG (Information Processing Society of Japan, Special Interest Group of Natural Language) Notes, Vol. 1998-NL-125, 1998. Which numeric value to be extracted is arbitrarily determined by a user.

When numeric values which have the same meaning but which are expressed in different units are included, the numeric values may possibly be regarded as having different meanings to each other. To address this problem, methods of converting different units into a single unit, such as disclosed in Japanese Patent Application Laid-open Publication No. 2004-178490 titled "Numerical Information Retrieving Device."

The present invention makes it possible to perform a document retrieval for data including essential numeric data, with a higher retrieval precision with similarities among the numeric values taken into consideration. The present invention will contribute to improve efficiencies of information seeking tasks.

BRIEF DESCRIPTION OF THE DRAWINGS

FIG. 3 is a schematic diagram showing examples of a search result, which is displayed in the client.

FIGS. 4A to 4C are diagrams each showing an example of a numeric conversion table.

FIG. 6 is a diagram showing examples of indexing.

FIG. 9 is a diagram showing an example of a correspondence table between standard medical terms/codes and numeric values.

FIG. 10 is a diagram showing an example of a correspondence table between standard medical terms/codes and intervals.

FIG. 20A is a diagram showing an example of a term dictionary of feature names. FIG. 20B is a diagram showing an example of a term dictionaries of units of measurement.

FIG. 21 is a diagram showing an example of a pattern dictionary.

FIG. 23A is a diagram showing an example of an analysis target designation table, and FIG. 23B is a diagram showing an example of analysis target data.

DESCRIPTIONS OF THE PREFERRED EMBODIMENT

Figure 1:
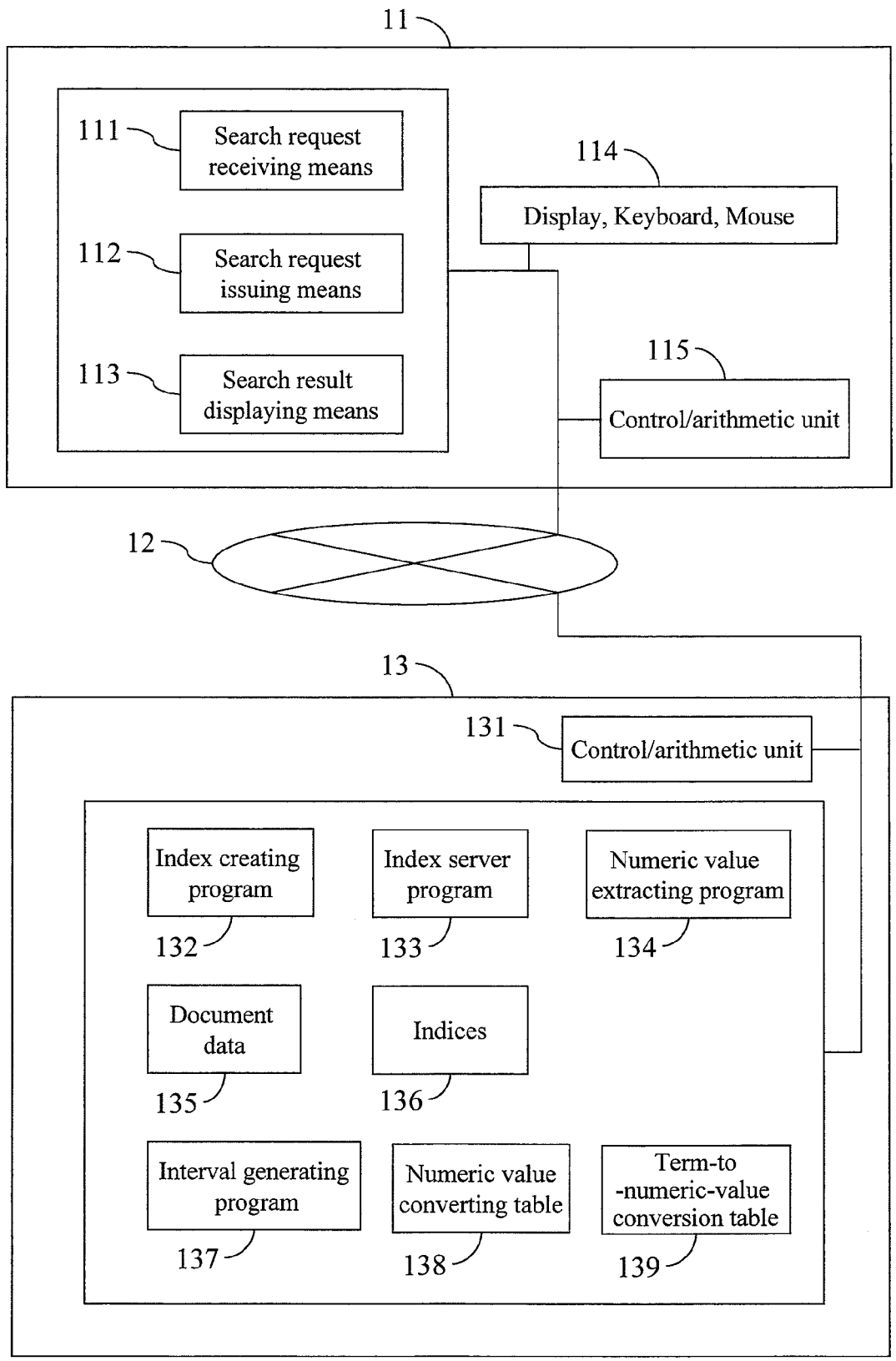
FIG. 1 is a diagram showing an example of a configuration of a system as an embodiment for carrying out the present invention.

FIG. 1 is a schematic diagram showing an example of a configuration of a system as an embodiment for carrying out the present invention. This system is configured of a client 11, a server 13, and a communications network 12 for connecting the client and the server. The client 11 includes: a search request receiving means 111 for receiving a search request from a user; a search request issuing means 112 for issuing a search request to the server upon receipt of the search request from the user; a search result displaying means 113 for displaying a search result to the user; a display, a keyboard and a mouse 114; and a control/arithmetic unit 115.

The server 13 includes a control/arithmetic unit 131, an index creating program 132, a search server program 133, a numeric value extracting program 134, document data 135, document indices 136, an interval generating program 137, a numeric conversion table 138, and a term-to-numeric-value conversion table 139. The numeric conversion table 138 is created in advance by use of the interval generating program 137. Detailed descriptions will be later provided for how the numeric conversion table 138 is created. The server 13 extracts an essential numeric datum from the search-target document data 135 by use of the numeric value extracting program 134 in advance. The server 13 indexes each document by use of the index creating program 132 as follows. When the numeric datum thus extracted belongs to a specific interval of the numeric conversion table 138, the server 13 sets the specific interval as an index for the numeric datum, and assigns the index with 1. Meanwhile, the server 13 indexes a text part in accordance with term frequencies, and thereafter stores, as an index 136 each term appearing in the document, a group of the term and term frequency information of the term. The indices thus created for the numeric data and the text part are used for subsequent retrieval processes.

Descriptions will be provided hereinbelow for how the client 11 acquires a document group associated with an arbitrary document group from the document database.

In response to an input by a user, the client 11 specifies a document group in a search-source document database by use of the search request issuing means 112, and sends information on the document designated by the user to the server 13 via the communications network 12. The server 13 searches the database for document groups having high degrees of association with (or having high similarities to) the designated document group, by use of the search server program 133 and the indices 136. A degree of association between documents can be calculated by use of the publicly-known vector space model. The server 13 sends the document retrieval result weighted with the degrees of association to the client 11 via the communications network 12. Through the foregoing method, the client 11 is capable of acquiring the document groups associated with the arbitrary document group from the document database 135.

Figure 2:
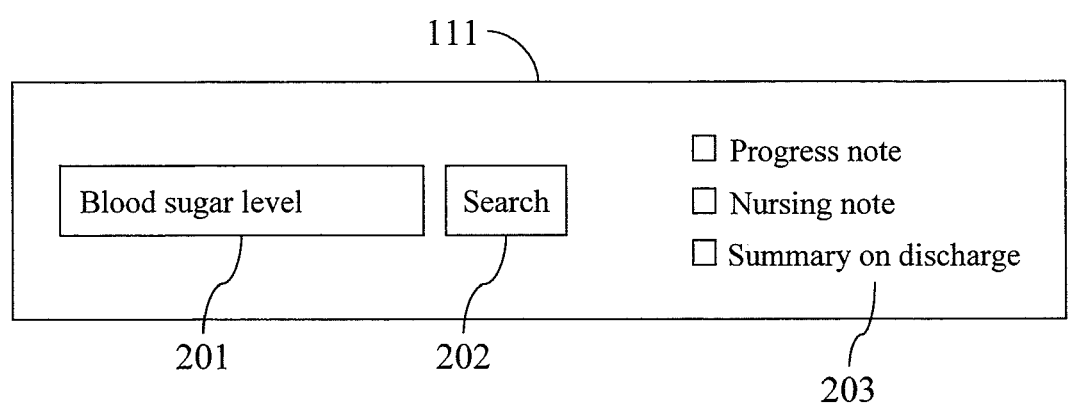
FIG. 2 is a schematic diagram showing an example of an initial screen of the client.

FIG. 2 is a diagram showing an example of an initial screen of the client 11. The user starts a search by entering a search request in a search request inputting area 201, and by subsequently clicking on a search instruction button 202. To use multiple sets of document data as search sources, the user specifies the sets of reference document data for retrieval by use of check boxes in a retrieval reference designation area 203.

FIG. 3 is a diagram showing examples of a search result of associated documents, which is displayed in the client 11. The search result displaying means 113 displays the search result. The search result displaying means 113 additionally works as document group designating means. By selecting an arbitrary number of reports by use of check boxes in a document selection area 301, and by subsequently clicking on an associative search instruction button 302, the user can make an associative search for documents associated with the selected article(s). When the user starts an associative search by checking a report on Patient ID 0350046 through the screen on the upper half of FIG. 3, reports as a result of the search are displayed on the screen in order of degree of association with the checked report, as shown in the lower half of FIG. 3. Note that this example is a result of an associative search by use of indices shown in FIG. 6.

FIGS. 4A to 4C each show examples of the numeric conversion table 138, which is used to convert, into indices, numeric values extracted from the search-target document data 135 by use of the numeric value extracting program 134. Each numeric datum extracted from a document is converted into an index corresponding to an interval of the numeric conversion table 138 to which the numeric datum belongs by use of the index creating program 132, and the index is assigned with 1. FIG. 4A shows an example of the numeric conversion table for data on blood sugar levels. The first column is a field of feature names each indicating a feature represented by numeric values, and the second column is a field for indicating intervals. The numeric conversion table is searched for an interval corresponding to a numeric value extracted from a document, and a group of the character string corresponding to the interval, and the feature represented by the numeric value is set as an index for the numeric value. FIG. 4B shows another example of the numeric conversion table for data on blood sugar levels, which has intervals different from those of the numeric conversion table shown in FIG. 4A. By use of different interval generating schemes, multiple indices can be generated for one numeric value representing one feature. Any numeric value can be converted into indices with various viewpoints by using tables generated by use of different interval generating schemes. FIG. 4C shows an example of the numeric conversion table for data on ages. According to a feature of a numeric value extracted from a document, a numeric conversion table 138 for use is selected.

Figure 5:
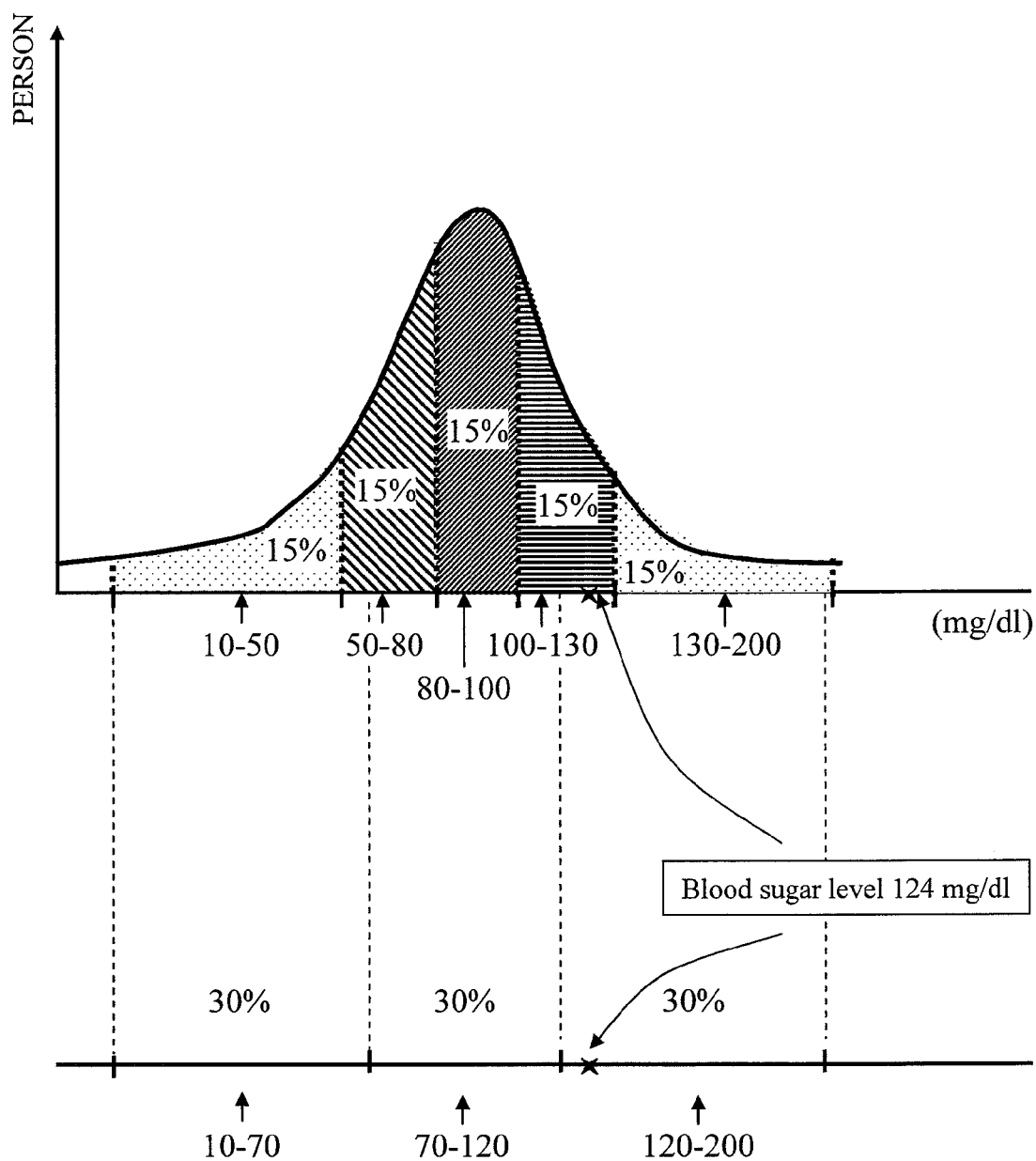
FIG. 5 is a diagram showing an example of how the numeric conversion table is created.

FIG. 5 is a diagram showing an example of how the numeric conversion table is created. In this example, a distribution of data on blood sugar levels of people is divided into several intervals so that each interval can include the same percentage of the people, and numeric values belonging to one interval are regarded similar in meaning to one another. In FIG. 5, the distribution of the data is divided into intervals so that each interval can include 15% of the people. The intervals thus created include: not less than 10 mg/dl but less than 50 mg/dl, not less than 50 mg/dl but less than 80 mg/dl, not less than 80 mg/dl but 100 mg/dl, not less than 100 mg/dl but 130 mg/dl, and not less than 130 mg/dl but 200 mg/dl. An example of the numeric conversion table created by use of this interval defining scheme is shown in FIG. 4A. Furthermore, by converting the numeric values into indices by using various types of interval defining schemes, multiple meanings from multiple viewpoints can be attributed to each numeric values being around the boundary between adjacent intervals. FIG. 5 shows an example in which the distribution of the data is divided into intervals so that each interval can include 30% of the people, in addition to the interval defining scheme for making each interval include 15% of the people. An example of indices generated by use of the interval defining scheme for making each interval include 30% of the people is shown in FIG. 4B. Suppose the case where document data includes numeric information indicating the blood sugar level of 124 mg/dl. In this case, by using the above two numeric conversion tables whose intervals are different between the tables, the blood sugar level of 124 mg/dl is indexed with two intervals of: not less than 100 mg/dl but less than 130 mg/dl, and not less than 120 mg/dl but not less than 200 mg/dl.

FIG. 6 shows an example of data of indices 136 created by use of the index creating program 132 and the like. In this example, each numeric datum is converted into an index consisting of a label indicating a feature of the numeric value and a term indicating its corresponding interval, and a frequency of the index is shown. In addition, the text part is indexed on the basis of term frequencies. Some sample reports shown in FIG. 3 each include data both on blood sugar level and the age of the corresponding patient. Here, numeric data on different features are converted into indices by using different numeric conversion tables each dedicated to a specific feature. By using the table shown in FIG. 4A, data on the blood sugar level included in the reports for Patient ID 0350046 and Patient ID 1112708 can be converted into indices, "blood sugar level %: not less than 100 mg/dl but less than 130 mg/dl," and "blood sugar level %: not less than 130 mg/dl but 200 mg/dl," respectively. In addition, by using the table shown in FIG. 4B, "blood sugar level %: not less than 120 mg/dl but less than 200 mg/dl" can be created for both Patient ID 0350046 and Patient ID 1112708. In this way, by indexing one feature with the indices calculated at different levels, the feature of each of the two patient IDs can be indexed from the various viewpoints. Moreover, by using the table on the different feature shown in FIG. 4C, the data on the ages for Patient ID 0350046 and Patient ID 1112711 can be converted into indices, "age %: not younger than 40 but younger than 60" and "age %: not younger than 60", respectively.

By using the interval generating program 137, the numeric conversion table 138 can be created by various methods in accordance with the characteristics of the numeric values. FIGS. 7 to 11 show examples of how numeric values with a distribution are covered by intervals.

Figure 7:
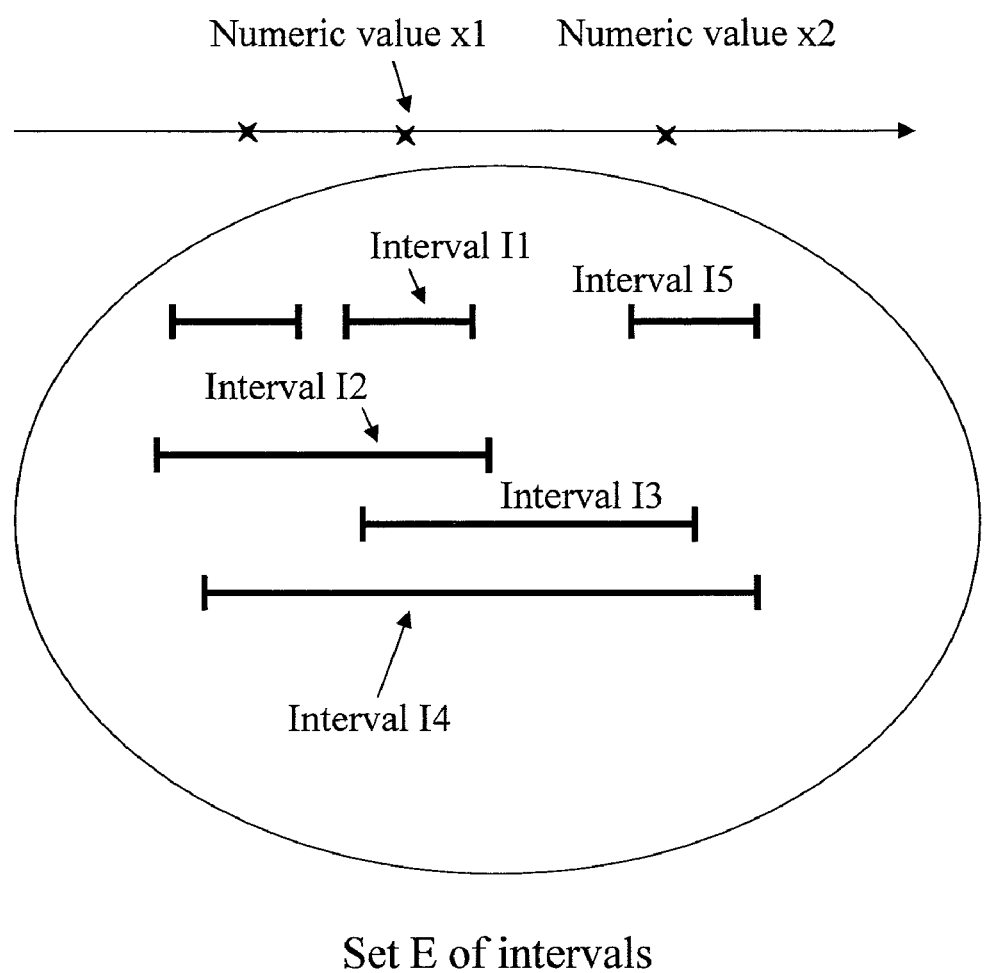
FIG. 7 is a diagram showing an example of intervals covering numeric values.

FIG. 7 shows an example of how numeric values with a distribution are covered by different percentage levels of intervals. All numeric values are covered by intervals belonging to a set. Each intervals of the set include the same percentage of the numeric values. A set E includes multiple sets, and each set consists of different percent level of intervals. For example, a numeric value $x_1$ belongs to four different percentage levels of intervals $I_1$, $I_2$, $I_3$ and $I_4$. Accordingly, when this numeric value $x_1$ is indexed, each of the intervals $I_1$, $I_2$, $I_3$ and $I_4$ each including the numeric value $x_1$ is assigned with 1. In addition, when a numeric value $x_2$ is indexed, each of the intervals $I_3$, $I_4$ and $I_5$ is assigned with 1. As described above, by indexing each numeric value with indices different either in width of intervals or in covering numeric values, meanings can be flexibly attributed to each numeric values such as being around the boundary between adjacent intervals.

Figure 8:
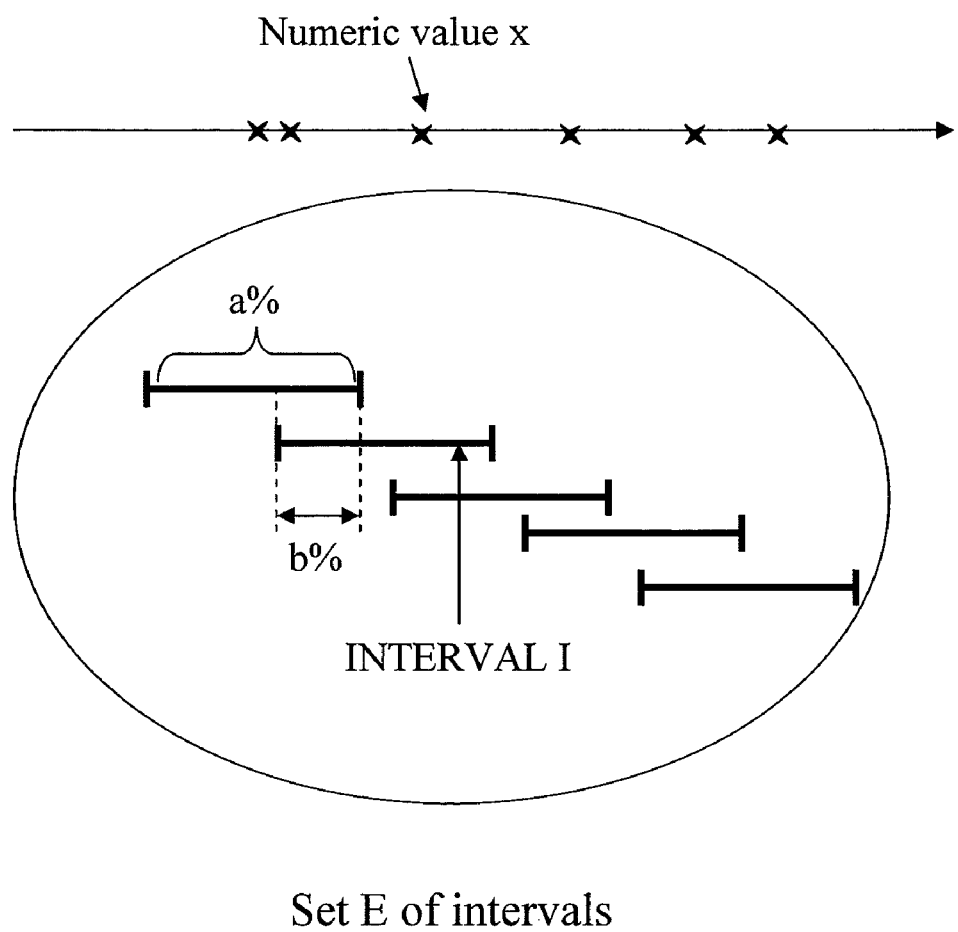
FIG. 8 is a diagram showing an example of intervals covering numeric values.

FIG. 8 shows an example how numeric values distributed in a certain pattern are covered by intervals, each of which includes the same percentage a % of the number of the numeric values, and each of which overlaps its adjacent intervals by b % of the number of the numeric values.

FIG. 9 is a diagram showing an example of the term-to-numeric-value conversion table 139. This is an example of correspondences between numeric values and standard terms/codes, each of which is used to describe a symptom in registering symptomatic findings in a medical record. The table shown in FIG. 9 shows correspondences between a group of terms describing sizes and numeric values indicated by the terms. Each of the terms describing sizes can be converted into the corresponding numeric value by use of this table. In FIG. 9, discrete numeric values indicate amounts of characteristics of the terms. In a case where an amount of characteristic represented by each of the terms vary, characteristics of the terms can be represented by intervals, as shown by another example of the term-to-numeric-value conversion table 139 in FIG. 10. When the document data include a numeric value representing a size, an interval including the numeric value is set as an index for the numeric data, and the index is assigned with 1. Thereby the numeric value is indexed. When the document data include a term representing a symptom, the corresponding interval is set as an index, and the index is assigned with 1. Thereby the term is indexed. In a case where standard terms/codes, such as length and weight, correspond to numeric values, indices are generated after values expressed using different units are transformed to those expressed using a single unit.

Figure 11:
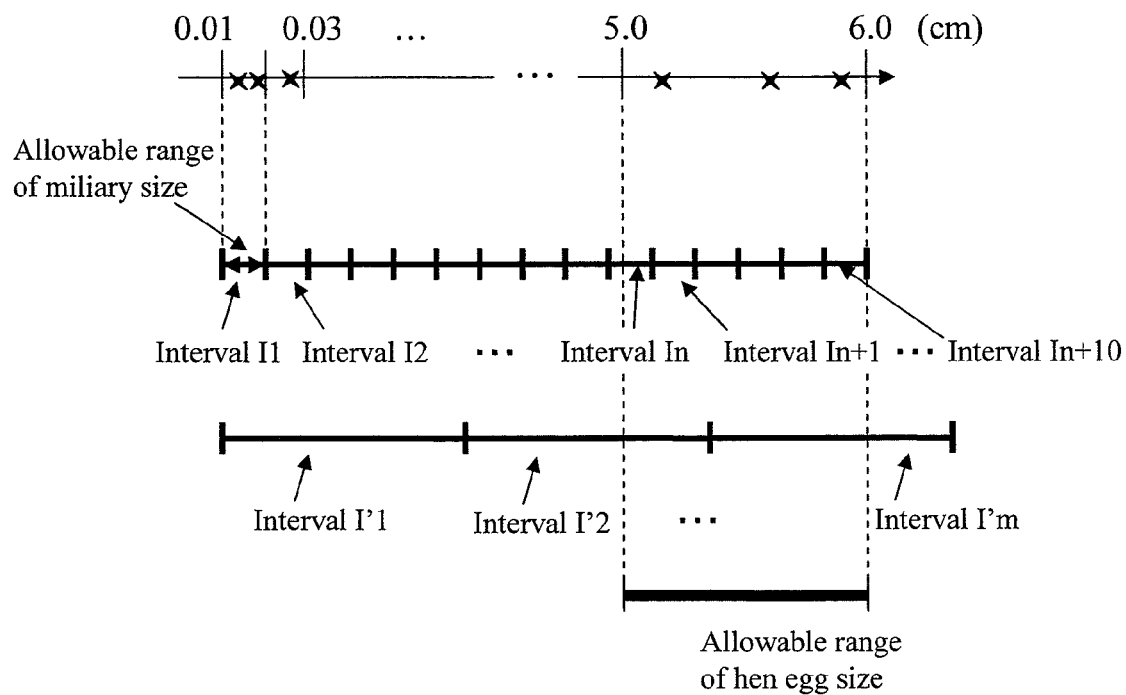
FIG. 11 is a diagram showing an example of how an index is created for each term.

FIG. 11 is a diagram illustrating how to index a document including multiple terms each representing a symptom, in a case where intervals corresponding to the multiple terms are generated with various allowable widths as shown by the example of FIG. 10. FIG. 11 shows an example of how a set of numeric values are covered by a set of intervals each having the shortest allowable width ("1 mm" represented by a term "miliary size" in the example of FIG. 10). When the document data include a numeric value representing a size, an interval including the numeric value is set as an index, and the index is assigned with 1. When the document data include a term, a set of intervals each having the shortest allowable width and overlapping the interval representing the characteristic of the term are set as indices. Thereafter, each of the indices is assigned with 1. In the example of FIG. 11, when the document data include a term "hen egg size," intervals $I_1$, $I_2$, $I_3$, . . . and $I_{n+10}$ are set as indices, and each of these indices is assigned with 1. Indices are generated by such an indexing method. Furthermore, by generating intervals $I'_1$, $I'_2$, . . . and $I'_m$ each having a width different from the shortest allowable width, a term or numeric value may be indexed with different intervals having different widths.

Figure 12:
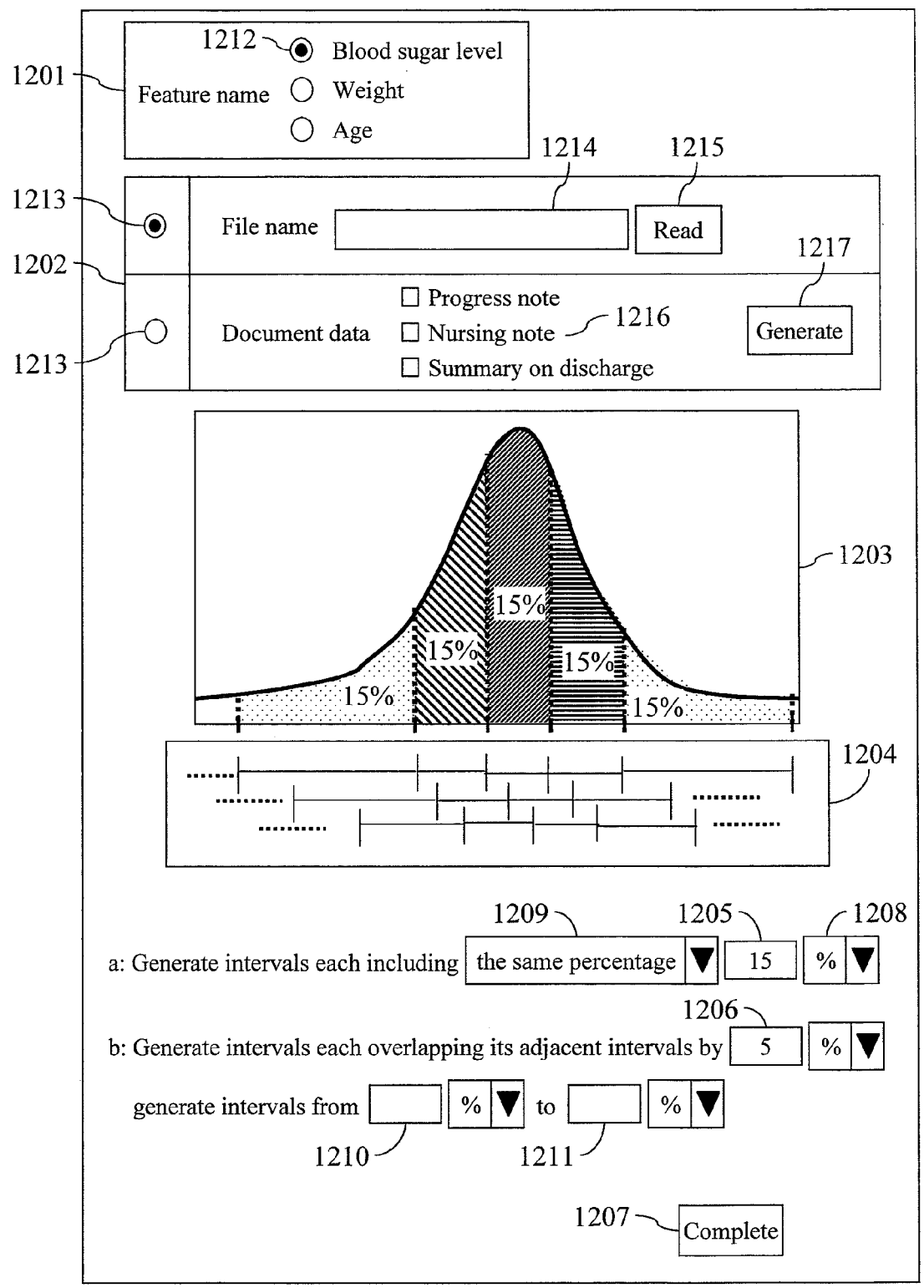
FIG. 12 is a diagram of an example of a user interface for creating the numeric conversion table.

FIG. 12 shows an example of a user interface for creating the numeric conversion table. A user selects a feature of data for which the user intends to generate intervals by selecting the corresponding one of feature name selection radio buttons 1212 in a feature designation area 1201. The data for which the user intends to generate intervals may either be arbitrarily given by the user through a data designation part 1214 in a data designation area 1202, or be generated from document data. The user selects one of these methods by selecting the corresponding one of radio buttons 1213 in the data designation area 1202. When the user intends to give data with a distribution, the user designates the data file through the data designation part 1214 for designating numeric data with a distribution, and thereafter presses a read button 1215. This causes the designated data to be read. The distribution of the read data is displayed on a distribution display part 1203. Alternately, when the user checks the lower one of the radio buttons 1213 in the data designation area, distribution data are generated from document data. The user selects at least one set of document data for which the user intends to generate a distribution by use of document data designation part 1216, and subsequently clicks on a distribution generate button 1217. In response to this request from the user, distribution data is generated for the data having the feature name which the user selects by use of the corresponding one of the feature name selection radio buttons 1212. The distribution data are generated by use of a numeric distribution data generating program (whose flow will be shown in FIG. 22). In the numeric distribution data generating program, first collected are data having the feature name selected by use of the feature name selection radio buttons 1212, from the document data designated by use of the document data designation part 1216, and then distribution data are generated. The distribution data thus generated is displayed on the distribution display part 1203.

For the distribution data, intervals are generated by use of the interval generating program 137. Once the user presses a completion button 1207 after designating parameters 1205 and 1206, the intervals 1204 and the numeric conversion table 138 are generated. The user interface may include unit selection radio boxes 1208, and a radio box 1209 through which the user can choose a type of intervals such as each having the same percentage of the distribution data, each having the same interval width, and the like. In addition, the user interface may be designed to allow the user to increase these functions as many as he/she needs so that various types of interval sets having different widths can be generated. Furthermore, the user interface may be designed for the user to designate the initial and end points between which the intervals should be generated so that he/she can designate a range within which the intervals are generated.

Figure 13:
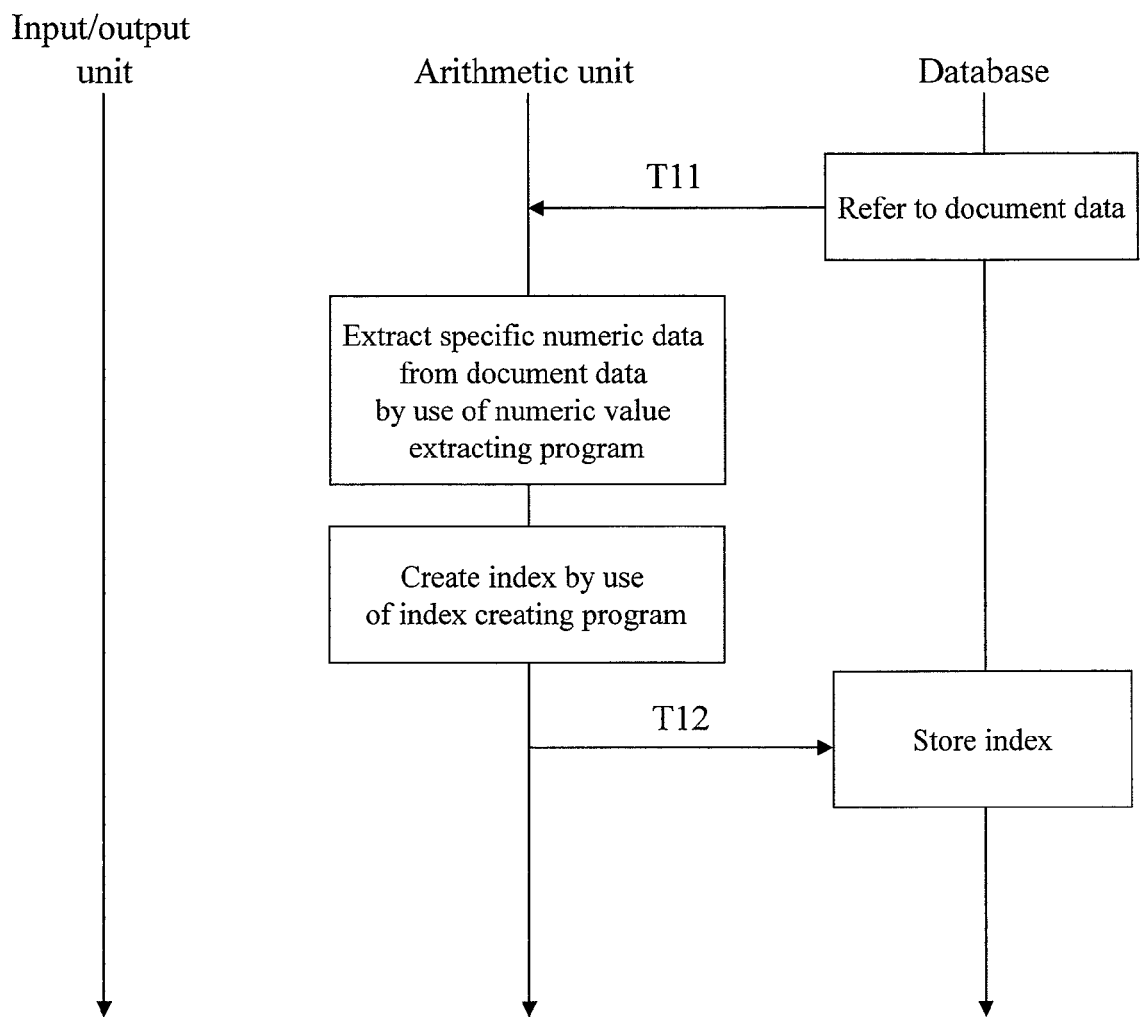
FIG. 13 is a sequence chart showing how numeric data are extracted, and how indices are created for the numeric data.

With reference to a sequence chart shown in FIG. 13, descriptions will be provided for how numeric data are extracted from the document data 135 by use of the numeric value extracting program 134, and how the indices 136 are created by use of the index creating program 132. The indices are created before the user starts a search.

The arithmetic unit refers to the document data 135 in the database (T11). The arithmetic unit extracts specific numeric data from the document data 135 by use of the numeric value extracting program 134. Subsequently, when a numeric datum belongs to a specific interval of the numeric conversion table 138, the arithmetic unit converts the numeric datum into an index representing the specific interval, and the index is assigned with 1, by use of the index generating program 132. Concurrently, the arithmetic unit indexes the text part in the document data 135 on the basis of term frequencies by use of the index generating program 132. Subsequently, the arithmetic unit causes the database to store the indices 136 created through the foregoing processes (T12). Details of the programs will be described later by use of flowcharts shown in FIGS. 15 and 16.

Figure 14:
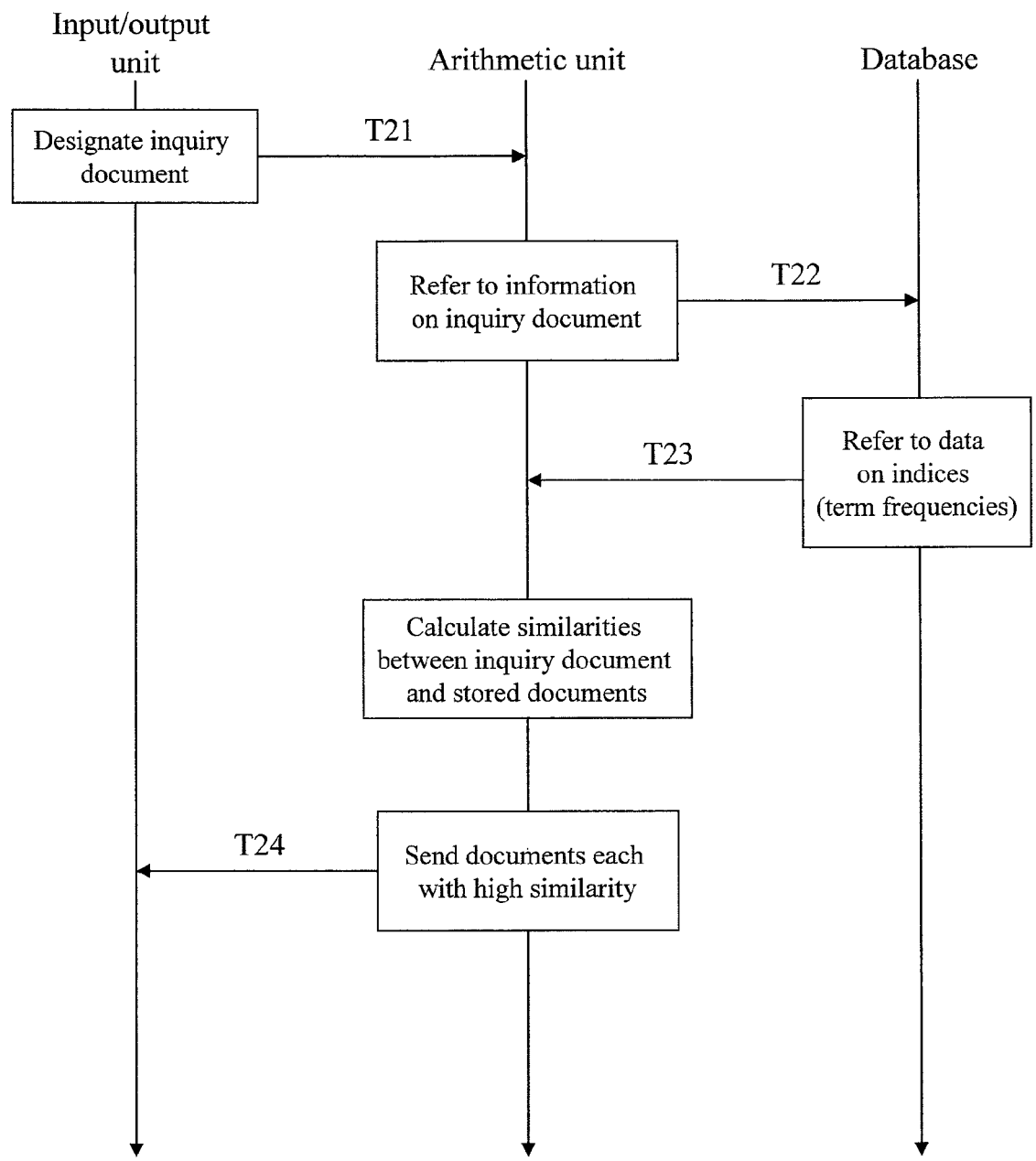
FIG. 14 is a sequence chart showing a data flow and a process flow between the client and the server.

With reference to a sequence chart shown in FIG. 14, descriptions will be provided for a data flow and a process flow between the client and the server. The user designates and inputs an inquiry document, and transmits the input to the arithmetic unit by use of the search request issuing means (T21). The arithmetic unit makes reference to term frequency data on the inquiry document and term frequency data on the documents stored in the document database including the inquiry document (T22 and T23). The arithmetic unit calculates similarities between the inquiry document and each of the documents stored in the database by using term frequency data, and then returns documents with high similarities to the inquiry document (T24).

Figure 15:
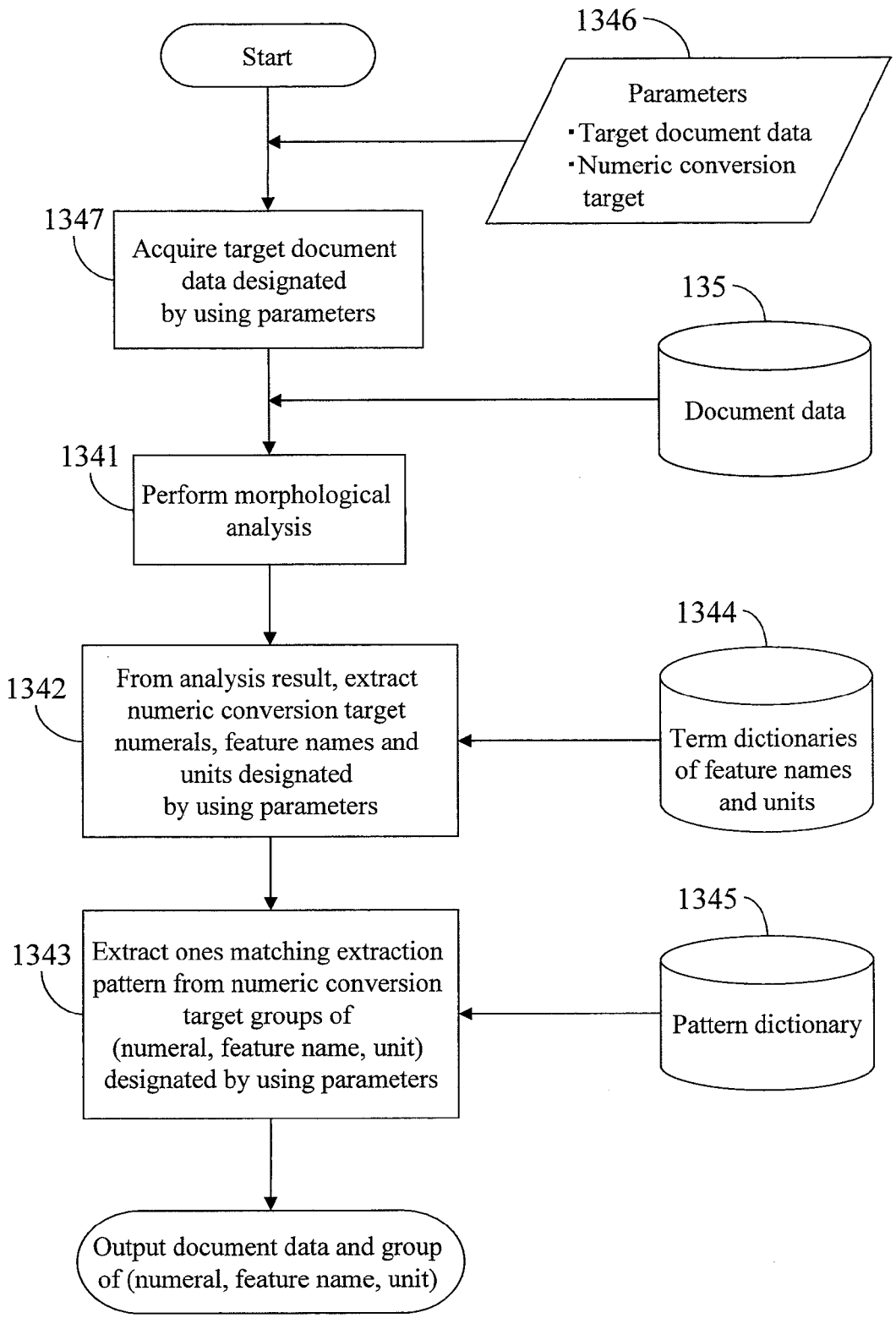
FIG. 15 is a diagram showing a flow of a numeric value extracting program.
Figure 16:
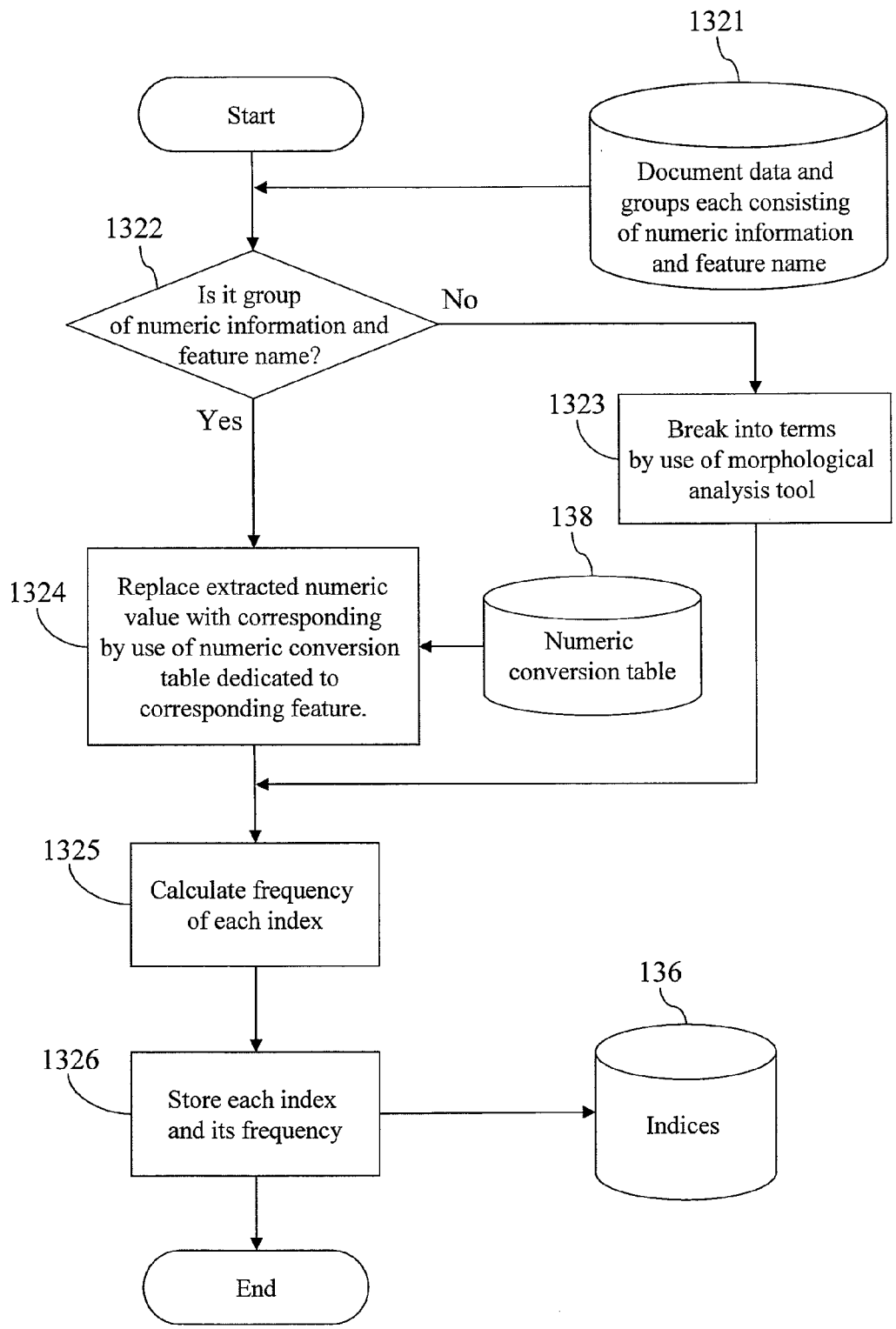
FIG. 16 is a diagram showing a flow of an index creating program.
Figure 17:
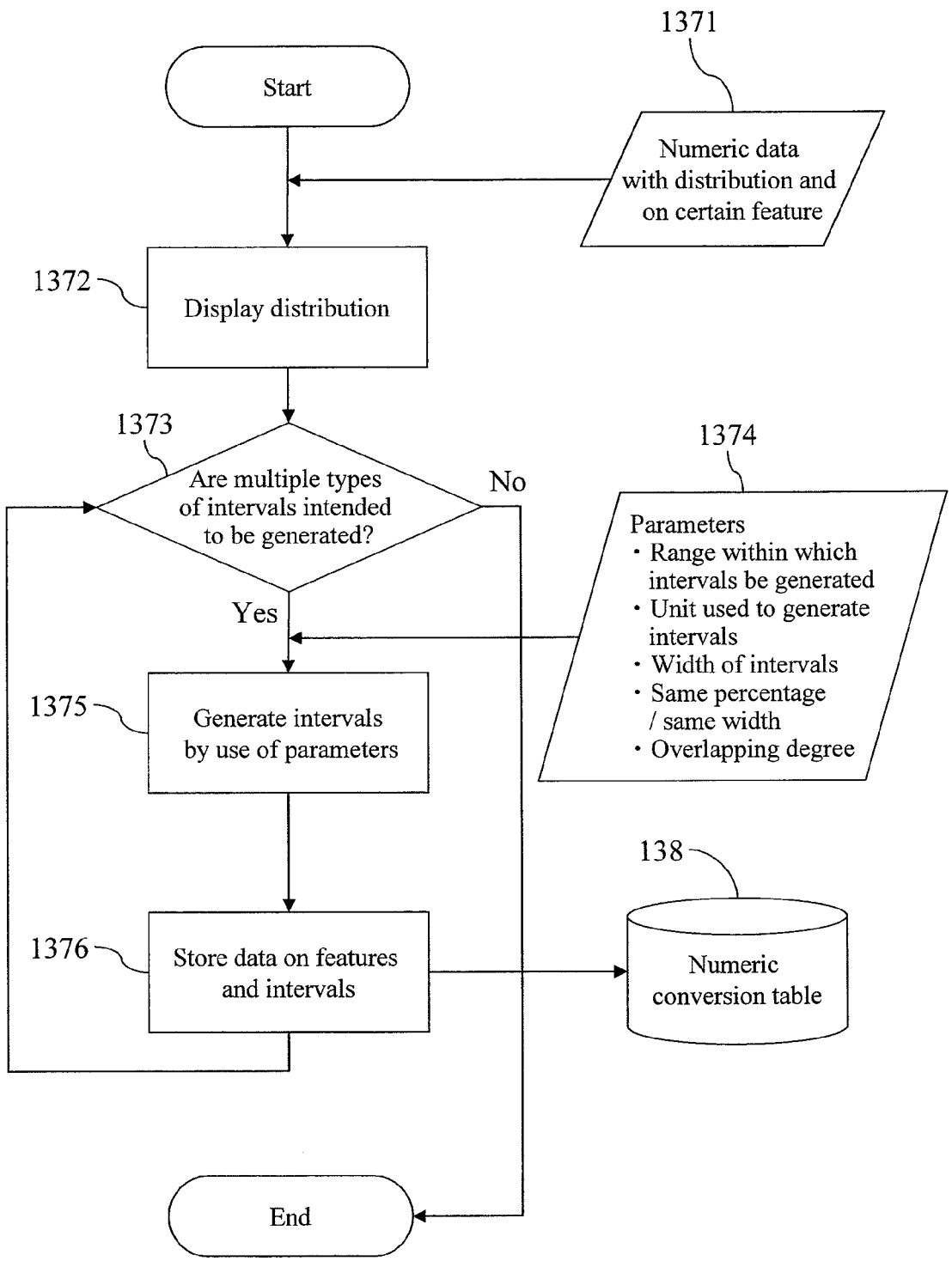
FIG. 17 is a diagram showing a flow of a program for generating intervals.

Descriptions will be provided for how the programs operate by use of flowcharts shown in FIGS. 15, 16 and 17. FIG. 15 is a flowchart illustrating the operation of the numeric value extracting program 134 for extracting an essential numeric value and its feature from the search-target document data 135. Here, a group of a specific feature and a numeric value representing the feature will be extracted as numeric information. The numeric value extracting program is activated when the user presses an index create button in an index creation interface shown in FIG. 19. Subsequently, the index creating program is executed. A feature to be extracted is designated by use of the index creation interface.

Document data 135 (1346) which the user specifies by use of the index creation interface are acquired (step 1347). Subsequently, the document data 135 thus acquired are analyzed by use of a morphological analysis tool such as chasen (step 1341). Thereafter, out of words classified as nouns as a result of the morphological analysis, terms, numerals and units of measurement related to the feature designated by the user are extracted by making reference to term dictionaries 1344 of feature names and units of measurement (step 1342). FIG. 20A shows an example of the term dictionary of feature names. Because some features are given various names, a term dictionary is created to cover all the different notations of feature names, and is used for the extraction. In addition, FIG. 20B shows an example of the term dictionary of units of measurement. Because various notations are used for units of measurement, a term dictionary is created to cover all the different notations of units of measurement, and is used for the extraction. Subsequently, information on numerals, units of measurement near the numerals, and features are extracted by using pattern matching (step 1343). Extraction target patterns each consisting of a "numeral," a "unit" and a "feature" are defined in advance, and are stored as a pattern dictionary (1345). An example of the pattern dictionary is shown in FIG. 21.

By use of FIG. 16, descriptions will be provided for how the index creating program 132 operates in a case where document data includes at least one group of a numeric value and its corresponding feature name. At least one group 1321 of information on a numeric value and its corresponding feature name is extracted from document data by use of the numeric value extracting program 134, and is associated with the document data, in advance. A text part and a numeric information part are processed separately (step 1322). The text part is broken into terms by use of the morphological analysis tool or the like (step 1323), and term frequencies are calculated (step 1325). In this case, either the terms or character strings such as those in N-gram may be used as indices. Furthermore, each text included in the numeric information part extracted in advance may or may not be processed here. The extracted numeric value is replaced with an interval including the extracted numeric value by use of at least one numeric conversion table dedicated to the corresponding feature (step 1324). Accordingly, the group of the numeric information and the corresponding feature name is converted into an index of a group of the interval and the feature name. Thereafter, the frequency of the index is calculated (step 1325). The database stores the index thus created and its frequency as an index (step 1326).

By use of FIG. 17, descriptions will be provided for an example of the interval generating program 137. Firstly, distribution data are prepared by using either of the following methods. Numeric data with a distribution and on the feature designated by use of the feature name selection radio buttons 1212 may be used. The numeric data are inputted by the user by use of the graphical user interface (1371 in FIG. 17, and 1214 and 1215 in FIG. 12). Alternatively, distribution data may be generated from the document data designated by use of the document data designation part 1216 (specifically, by use of the numeric distribution data generating program (whose flow will be shown in FIG. 22), distribution data on the feature designated by use of the feature name selection radio buttons 1212 is generated from the document data designated by use of the document data designation part 1216). Subsequently, the distribution thus generated is displayed (step 1372). As many types of intervals as the user specifies (step 1373), interval sets are generated by use of parameters 1374 designated by the user (such parameters 1374 including: a range within which the intervals should be generated, a unit of measurement used to generate the intervals, a width of the intervals, whether each of the intervals should have the same percentage of the distribution data or the same width, and how adjacent intervals overlap each other) (step 1375). Data on features and their corresponding intervals thus generated are stored as the numeric conversion table 138 (step 1376).

Figures 18A, 18B, 19:
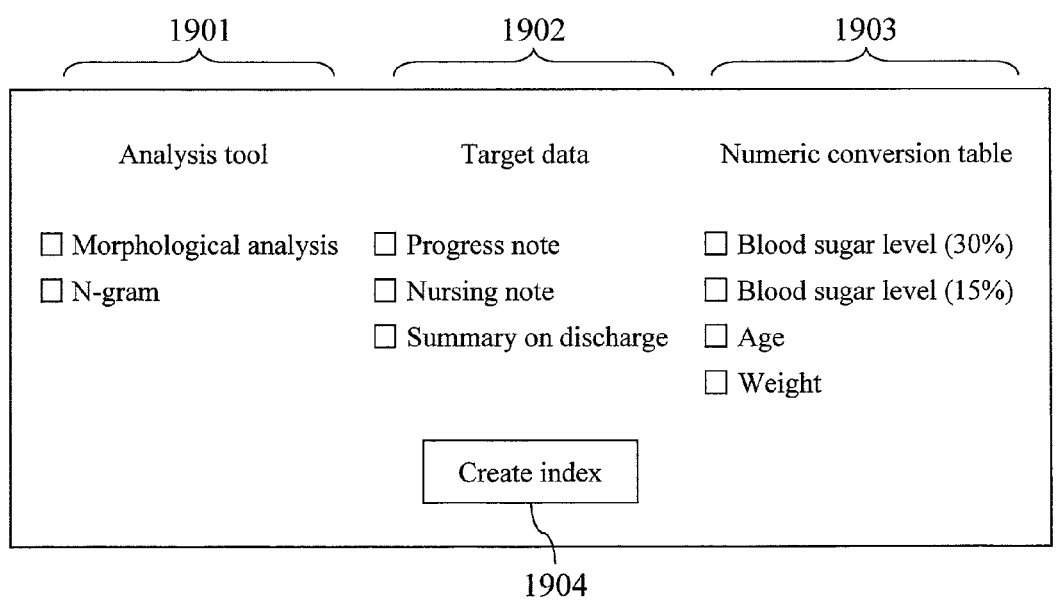
FIG. 18A is a diagram showing an example of a feature information dictionary.
FIG. 18B is a diagram showing an example of a conversion information dictionary.
FIG. 19 is a diagram showing an example of a user interface for creating an index.

FIGS. 18A and 18B show examples of a feature information dictionary and a conversion information dictionary, respectively. Both of them are used to perform a unit conversion on various descriptions for a numeric value provided by using different notations or different units. The method of converting different units into a single unit, disclosed in Japanese Patent Application Laid-open Publication No. 2004-178490 titled "Numerical Information Retrieving Device," is used as a reference. A unit conversion is performed after the numeric value extracting program 134 is applied to the document data. When a group of a numeral and a unit of measurement appears in the document data, it is checked whether or not a unit conversion needs to be performed on the group by use of the feature information dictionary. The feature information dictionary stores the unit conversion target groups each consisting of a numeral and a unit of measurement as well as feature names. When a unit conversion target group of a numeral and a unit of measurement appears in the document data, the character string is provided with a tag. The conversion information dictionary stores pre-converted groups each consisting of a numeral and a unit of measurement as well as post-converted groups each consisting of a numeral and a unit of measurement. When the tagged character string corresponds to one of the pre-converted groups as a result of the check by use of the conversion information dictionary, the group is replaced by the corresponding post-converted group. In this way, different units are converted into a single unit.

Hereinafter, descriptions will be provided for an example case by use of the following example sentences (a), (b) and (c).

(a) a tumor with a size of 0.15 cm
(b) a tumor with a size of 20 mm
(c) a tumor with a size of 0.05 m By use of the numeric value extracting program 134, tags are provided to term representing the feature, the numeral and its accompanying unit for each sentence.

(a-1) <FEATURE>a tumor with a size of</FEATURE><NUMERAL AND UNIT>0.15 cm</NUMERAL AND UNIT>
(b-1) <FEATURE>a tumor with a size of</FEATURE><NUMERAL AND UNIT>20 mm</NUMERAL AND UNIT>
(c-1) <FEATURE>a tumor with a size of</FEATURE><NUMERAL AND UNIT>0.05 m</NUMERAL AND UNIT>

Subsequently, by use of the feature information dictionary, it is checked whether or not a unit conversion needs to be performed on a group of a numeral and a unit in each tagged parts. Each of the groups on which a unit conversion needs to be performed is provided with a tag for the unit conversion.

(a-2) <FEATURE>a tumor with a size of</FEATURE><NUMERAL AND UNIT><LENGTH>0.15 cm</LENGTH></NUMERAL AND UNIT>
(b-2) <FEATURE>a tumor with a size of</FEATURE><NUMERAL AND UNIT>20 mm</NUMERAL AND UNIT>
(c-2) <FEATURE>a tumor with a size of</FEATURE><NUMERAL AND UNIT><LENGTH>0.05 m</LENGTH></NUMERAL AND UNIT>

By use of the conversion information dictionary, the unit conversion is performed on each of the character strings determined to need a unit conversion.

(a-3) <FEATURE>a tumor with a size of</FEATURE><NUMERAL AND UNIT>$0.15*10**2$ mm</NUMERAL AND UNIT>
(b-3) <FEATURE>a tumor with a size of</FEATURE><NUMERAL AND UNIT>20 mm</NUMERAL AND UNIT>
(c-3) <FEATURE>a tumor with a size of</FEATURE><NUMERAL AND UNIT>$0.05*10**3$ mm</NUMERAL AND UNIT>

FIG. 19 shows an example of an index creation interface. This interface includes: an analysis tool designation part 1901 for designating a analysis tool for analyzing document data, such as a morphological analysis tool, N-gram or the like; a data designation part 1902 for designating analysis target data; a numeric-conversion-table designation part 1903 for designating an arbitrary table out of multiple numeric conversion tables; and an index create button 1904.

FIG. 21 shows an example of a pattern dictionary 1345. If an expression in a document matches one of the patterns stored in the pattern dictionary, information on the corresponding feature is extracted. Every time a term "blood sugar level," a "numeral," and a unit "mg/dl" appear in a document in this sequence, the character string is determined to match a pattern "blood sugar level+numeral+mg/dl". Accordingly, the matching character strings are extracted as information on the blood sugar level, and is provided with a tag. Incidentally, the maximum number of words for the extraction may be set.

Figure 22:
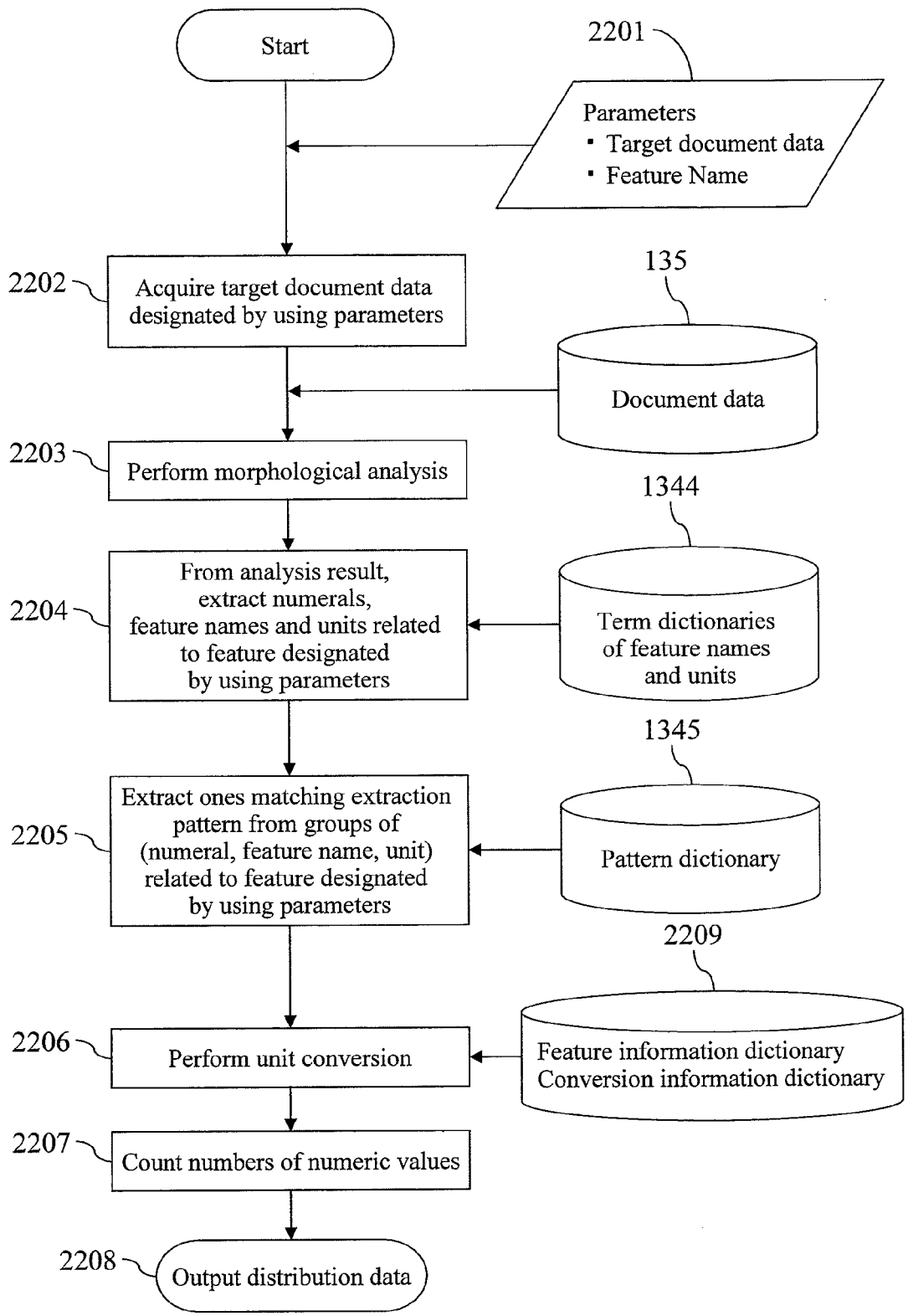
FIG. 22 is a diagram showing a flow of a numeric distribution data generating program.

A flowchart of FIG. 22 shows a flow of processing executed by the numeric distribution data generating program. The numeric distribution data generating program is activated by use of a distribution generate button in the interface for creating a numeric conversion table shown in FIG. 12. Document data 135 designated by use of the feature name selection radio buttons 1212 (2201) are acquired (step 2202). Subsequently, the morphological analysis is applied to the document data (in step S2203). Out of words classified as nouns as a result of the morphological analysis, terms, numerals and units of measurement related to the feature designated by the user are extracted by making reference to the term dictionaries 1344 of feature names and units of measurement (step 2204). Subsequently, information on numerals, units near the numerals, and features are extracted by using pattern matching (step 2205), and thereafter outputted. Extraction target patterns each consisting of a "numeral," a "unit" and a "feature are defined in advance, and are stored as a pattern dictionary 1345. An example of the pattern dictionary is shown in FIG. 21. The extracted information on numerals may probably include different units for the same feature. Accordingly, the unit conversion is performed by use of the feature information dictionary and the conversion information dictionary 2209 (step 2206). The number of the extracted numerals is counted for each feature (step 2207). Thereby, distribution data is created and outputted (step 2208). The data thus created is inputted into the interval generating program 137.

FIG. 23A shows an example of an analysis target designation table for designating which item in data should be analyzed so as to create an index. In the analysis target designation table, the first column includes types of data, the second column includes names of items in each of which analysis target document data is stored, and each of the columns after the third includes names of items in each of which feature data is stored. FIG. 23B shows an example of analysis target data. This example of analysis target data is data on progress notes. In the data on progress notes, an item named "Report" of the third column stores document data, and an item named "Basic Information (Age)" of the fourth column stores age information. In a case where the user wishes to create an index for each datum on blood sugar level and each datum on age by performing an numeric conversion on them, the indices needs to be created by use of the item storing document data and the item storing data on age. Accordingly, by referring to a line whose type of data is "Progress Note" in the analysis target designation table, the names of the items storing document data and data on age are acquired, and these items in the data on the progress notes are analyzed.

What is claimed is:

1. A document retrieval system, comprising:
    a document database for storing data for a plurality of documents;
    an arithmetic unit that: includes a numeric value data reading unit configured to read, from the data on the documents stored in the document database, numeric value data for which numeric value intervals are to be generated; calculates indices used for indexing numeric values and texts in each of the documents stored in the document database, each of the indices used for indexing the text being a group of a term constituting the text and a frequency of the term in the document, each of the indices used for indexing the numeric value being a group of a label describing a feature represented by the numeric value, an interval including the numeric value, and a frequency of the numeric value in the document; receives a designation of a document as a retrieval input; and computes a similarity between the designated document and each of the documents stored in the document database by use of the indices; and
    a numeric value distribution percentage designating unit configured to designate the numeric value intervals from distribution percentages of numeric values based on a distribution of the numeric value data, wherein
    the arithmetic unit includes a numeric value range designating unit configured to generate the numeric value intervals based on distribution percentages inputted by the numeric value distribution percentage designating unit; and
    the numeric value distribution percentage designating means generates numeric value intervals whose numeric value widths are so adjusted that each of the numeric value intervals includes an equal number of numeric values.

2. The document retrieval system according to claim 1, wherein the interval constitutes a set E of intervals in which each element in a set D of numeric values representing a feature A is included in at least any one of the intervals.

3. The document retrieval system according to claim 2, wherein the set E of the intervals includes a group of intervals partially overlapping one another.

4. The document retrieval system according to claim 1, further comprising:
    a numeric value extracting processing unit;
    a numeric conversion table for converting a numeric value into an interval, the numeric conversion table is dedicated to each feature type; and
    an index creating unit,
    wherein the numeric value extracting processing unit extracts a group of a feature and a numeric value from each of the documents stored in the document database, and
    the index creating unit indexes the extracted group of the feature and the numeric value in accordance with the numeric conversion table.

5. The document retrieval system according to claim 4, further comprising:
    a term-to-numeric-value conversion table for associating a group of a feature and a term with a group of the feature and the term's corresponding numeric value or interval,
    wherein the numeric value extracting processing unit extracts a group of a feature and a term from the document, and converts the extracted group of the feature and the term into a group of the feature and the term's corresponding numeric value or interval in accordance with the term-to-numeric-value conversion table, and
    in accordance with the numeric conversion table, the index creating unit indexes the group of the feature and the term which has been converted into the group of the feature and the numeric value or interval in accordance with the term-to-numeric-value conversion table.

6. A document retrieval method comprising:
    receiving a designation of a document as a retrieval input;
    reading from data on documents stored in the document database, numeric value data for which numeric value intervals are to be generated;
    calculating a similarity between the document designated as the retrieval input and each of the documents stored in the document database by use of indices of the designated document and indices of each document stored in the document database, the indices used for indexing numeric values and texts in a corresponding document, each of the indices used for indexing the text being a group of a term constituting the text and a frequency of the term in the corresponding document, each of the indices used for indexing the numeric value being a group of a label describing a feature represented by the numeric value, an interval including the numeric value, and a frequency of the numeric value in the corresponding document;
    presenting the documents stored in the document database in order of similarity;
    deciding the numeric value intervals from distribution percentages of numeric values based on a distribution of the numeric value data; and
    generating the numeric value intervals based on distribution percentages inputted by the numeric value distribution percentage designating unit;
    wherein the generating the numeric value intervals generates numeric value intervals whose numeric value widths are so adjusted that each of the numeric value intervals includes an equal number of numeric values.

7. The document retrieval method according to claim 6, wherein the interval constitutes a set E of intervals in which each element in a set D of numeric values representing a feature A is included in at least any one of the intervals.

8. The document retrieval method according to claim 7, wherein the set E of the intervals includes a group of intervals partially overlapping one another.

9. The document retrieval method according to claim 6, further comprising:
    extracting a group of a feature and a numeric value from each of the documents stored in the document database; and indexing the extracted group of the feature and the numeric value in accordance with a numeric conversion table for converting a numeric value into an interval, the numeric conversion table is dedicated to each feature type.

10. The document retrieval method according to claim 9, further comprising:

extracting a group of a feature and a term from the document;

converting the extracted group of the feature and the term into a group of the feature and the term's corresponding numeric value or interval in accordance with a term-to-numeric-value conversion table for associating a group of a feature and a term with a group of the feature and the term's corresponding numeric value or interval; and in accordance with the numeric conversion table, indexing the group of the feature and the term which has been converted into the group of the feature and the numeric value or interval in a preceding operation.

11. A document retrieval method comprising:

extracting a group of a feature and a numeric value from each of a plurality of document data stored in a document database, to obtain numeric value data for which numeric value intervals are to be generated;

converting the extracted numeric value into an interval in accordance with a numeric conversion table, and then indexing the extracted numeric value with a group of the feature, the interval and a frequency, the numeric conversion table being dedicated to each feature type, and used for converting an numeric value into an interval;

indexing each text in the document with a group of a term constituting the text and a frequency of the term in the document;

calculating a similarity between document data designated as a retrieval input and each of the documents stored in the document database by use of data on the document indexed as above;

presenting the document data stored in the document database in order of similarity;

deciding the numeric value intervals from distribution percentages of numeric values based on a distribution of the numeric value data;

generating the numeric value intervals based on distribution percentages inputted by the numeric value distribution percentage designating unit; and wherein the generating the numeric value intervals generates numeric value intervals whose numeric value widths are so adjusted that each of the numeric value intervals includes an equal number of numeric values.

12. The document retrieval method according to claim 11, wherein the interval constitutes a set E of intervals in which each element in a set D of numeric values representing a feature A is included in at least any one of the intervals.

13. The document retrieval method according to claim 11, further comprising:

extracting a group of a feature and a term from a document;

converting the extracted group of the feature and the term into a group of the feature and the term's corresponding numeric value or interval in accordance with a term-to-numeric-value conversion table for associating a group of a feature and a term with a group of the feature and the term's corresponding numeric value or interval; and in accordance with the numeric conversion table, indexing the group of the feature and the term which has been converted into the group of the feature and the numeric value or interval in the preceding step.

* * * * *